United States Patent
Arai

(10) Patent No.: US 7,158,599 B2
(45) Date of Patent: Jan. 2, 2007

(54) ELASTIC STORE CIRCUIT

(75) Inventor: Narihiro Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 1099 days.

(21) Appl. No.: 10/053,602

(22) Filed: Jan. 24, 2002

(65) Prior Publication Data

US 2002/0097754 A1 Jul. 25, 2002

(30) Foreign Application Priority Data

Jan. 25, 2001 (JP) .............................. 2001-017548

(51) Int. Cl.
*H04J 3/06* (2006.01)

(52) U.S. Cl. ..................................... 375/372

(58) Field of Classification Search ................ 375/372, 375/259, 260, 295, 340; 370/468, 464, 471, 370/518, 519
See application file for complete search history.

(56) References Cited

U.S. PATENT DOCUMENTS

| | | | |
|---|---|---|---|
| 5,517,248 A * | 5/1996 | Isoda ......................... | 348/459 |
| 6,865,241 B1* | 3/2005 | Adkins et al. .............. | 375/372 |
| 2002/0018261 A1* | 2/2002 | Takeguchi et al. .......... | 359/124 |
| 2002/0107985 A1* | 8/2002 | Hwang et al. .............. | 709/246 |

* cited by examiner

*Primary Examiner*—Chieh M. Fan
*Assistant Examiner*—Dung X. Nguyen
(74) *Attorney, Agent, or Firm*—McGinn IP Law Group, PLLC

(57) ABSTRACT

An elastic store circuit includes a set/reset flip-flop circuit corresponding to plural pieces of input data and an AND circuit for receiving the output of each flip-flop circuit. Upon receipt of a frame pulse indicating the head of each piece of input data, the flip-flop circuit outputs a signal to the AND circuit. The AND circuit outputs an H signal when it receives signals from all flip-flop circuits, and detects the receipt of the data having the longest delay time. According to the output signal of the AND circuit, data is read from each unit of elastic store memory.

8 Claims, 4 Drawing Sheets

ELASTIC STORE CIRCUIT

BACKGROUND OF THE INVENTION

1. Field of the Invention

The present invention relates to an elastic store circuit for absorbing the propagation delay time difference among plural pieces of data transmitted through different transmission lines.

2. Description of the Related Prior Art

For example, assume that optical fiber capable of transmitting data of a maximum of 2.4 Gbps is used in a section of an optical fiber transmission line through which data of 10 Gbps is transmitted. First, data of 10 Gbps is divided into four pieces of data of 2.4 Gbps, and then the data of 10 Gbps is to be restored from the four pieces of data of 2.4 Gbps. If the four pieces of data of 2.4 Gbps are transmitted through different transmission lines, then there arise propagation time differences among the four pieces of data based on the variance of each transmission line. In this case, an elastic store circuit is required to absorb the propagation delay time difference.

FIG. 1 shows an example of a public elastic store circuit. The circuit includes a clock selector 4, a frame pulse retiming circuit 8, four frame counters 9, a detection circuit 10, and a read address counter 7. The data of 2.4 Gbps transmitted through four transmission lines are converted from optical signals to electric signals, and provided with clock and frame pulses. Since these four pieces of data of 2.4 Gbps are asynchronous to one another, it is necessary for the elastic store circuit to set these pieces of data in a synchronous state.

The operation of the circuit shown in FIG. 1 is described below. The clock selector 4 optionally selects a read clock of elastic store memory 6 from among the four asynchronous clocks. The frame pulse retiming circuit 8 retimes the four frame pulses indicating the MSB (most significant bit) by the read clock optionally selected by the clock selector 4. The retiming operations are completely asynchronous. The frame pulse after the retiming operation is used as a load pulse of the frame counter 9. Each of the frame counters 9 is initialized in the receipt order of the frame pulses, and each frame counter 9 starts counting data of 2.4 Gbps by the clock selected by the clock selector 4. The detection circuit 10 compares the count values of the four frame counters, and determines that the data having the minimum count value for a predetermined time is the data of 2.4 Gbps which arrived last. The output based on the determination result is a load pulse of the read address counter 7 of the elastic store memory 6. Therefore, the read phase of the elastic store memory 6 is determined based on the data of 2.4 Gbps having the longest propagation delay time. As a result, the propagation delay time differences among the four pieces of data of 2.4 Gbps are absorbed, thereby successfully restoring the data of 10 Gbps.

However, the above mentioned elastic store circuit includes, for example, four frame counters for counting one frame (125 μsec) of the SONET/SDH frame format, and compares the count values of the respective frame counters. Therefore, the circuit is complicated and large, and requires large power consumption. Furthermore, the circuit retimes four asynchronous frame pulses using one clock so as to realize the synchronous operations of four pieces of data of 2.4 Gbps. However, the frame pulse is normally a single pulse of 1 clock width. When the retiming phases for retiming frame pulses are asynchronous to one another, the output of the retiming flip-flop circuit falls in a metastable state, and the frame pulses having a single clock width are not correctly retimed.

SUMMARY OF THE INVENTION

Therefore, the present invention aims at providing an elastic store circuit and a data receiving method capable of reducing the circuit size and the power consumption by simplifying the detection unit for detecting the receipt of data having the longest propagation delay time, and also detecting correct data.

To attain the above mentioned object, the elastic store circuit according to the present invention includes: a clock selector for selecting a read clock from a plurality of clocks; a data receipt detection circuit for detecting plural pieces of received data; a longest delay data detection circuit for detecting data having the longest propagation delay time; and a reset circuit for receiving the output from the longest delay data signal detection circuit and a read clock, and transmitting a reset signal to the data receipt detection circuit and a read address counter of the elastic store memory. The reset signal can be transmitted to the data receipt detection circuit through the read address counter of the elastic store memory. The longest delay data signal detection circuit can use an AND circuit for inputting each output signal of the data receipt detection circuit.

The data receiving method according to the present invention includes the steps of: receiving data from a plurality of transmission lines and storing the data in the elastic store memory, receiving a clock and frame pulse corresponding the data, selecting one read clock from a plurality of clocks, receiving a frame pulse by the AND circuit and detecting the last received data, and reading the data from each elastic store memory according to the signal based on the output from the AND circuit and the read clock.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
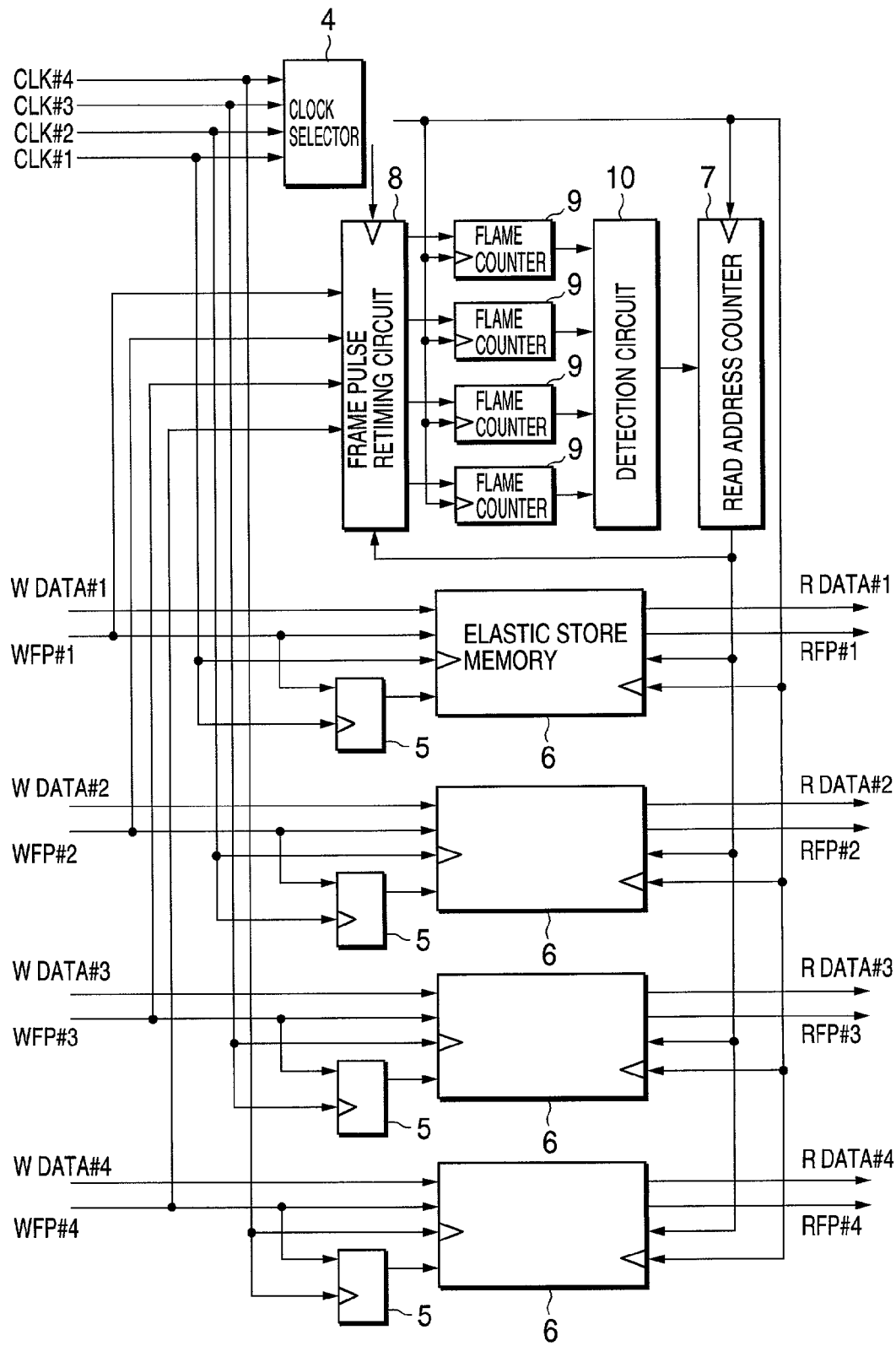
FIG. 1 shows an example of a conventional elastic store circuit.
Figure 2:
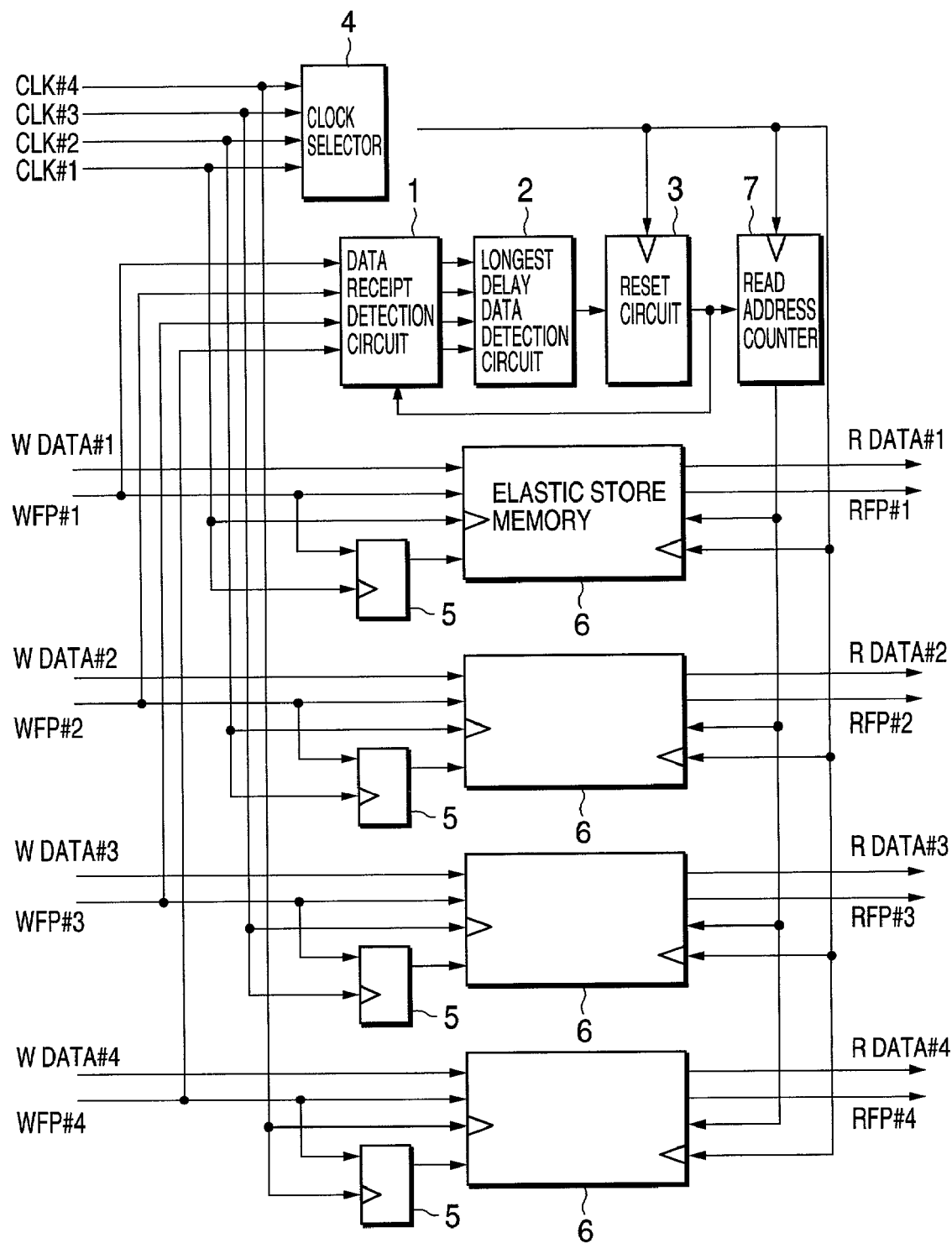
FIG. 2 is a block diagram of an example of the elastic store circuit according to the present invention.

By referring to FIG. 2, the elastic store circuit of the first example comprises: the clock selector 4 for selecting one clock from among four input clocks (CLK#1–#4); and a data receipt detection circuit 1 for inputting four frame pulses (WFP#1–#4). Furthermore, the elastic store circuit also comprises: a longest delay data detection circuit 2 for receiving data receipt information from the data receipt detection circuit 1; and a reset circuit 3 for receiving output of each of the longest delay data detection circuit 2 and the clock selector 4, and outputting a reset pulse. The reset pulse is transmitted to a read address counter 7 and the data receipt detection circuit 1.

Figure 3:
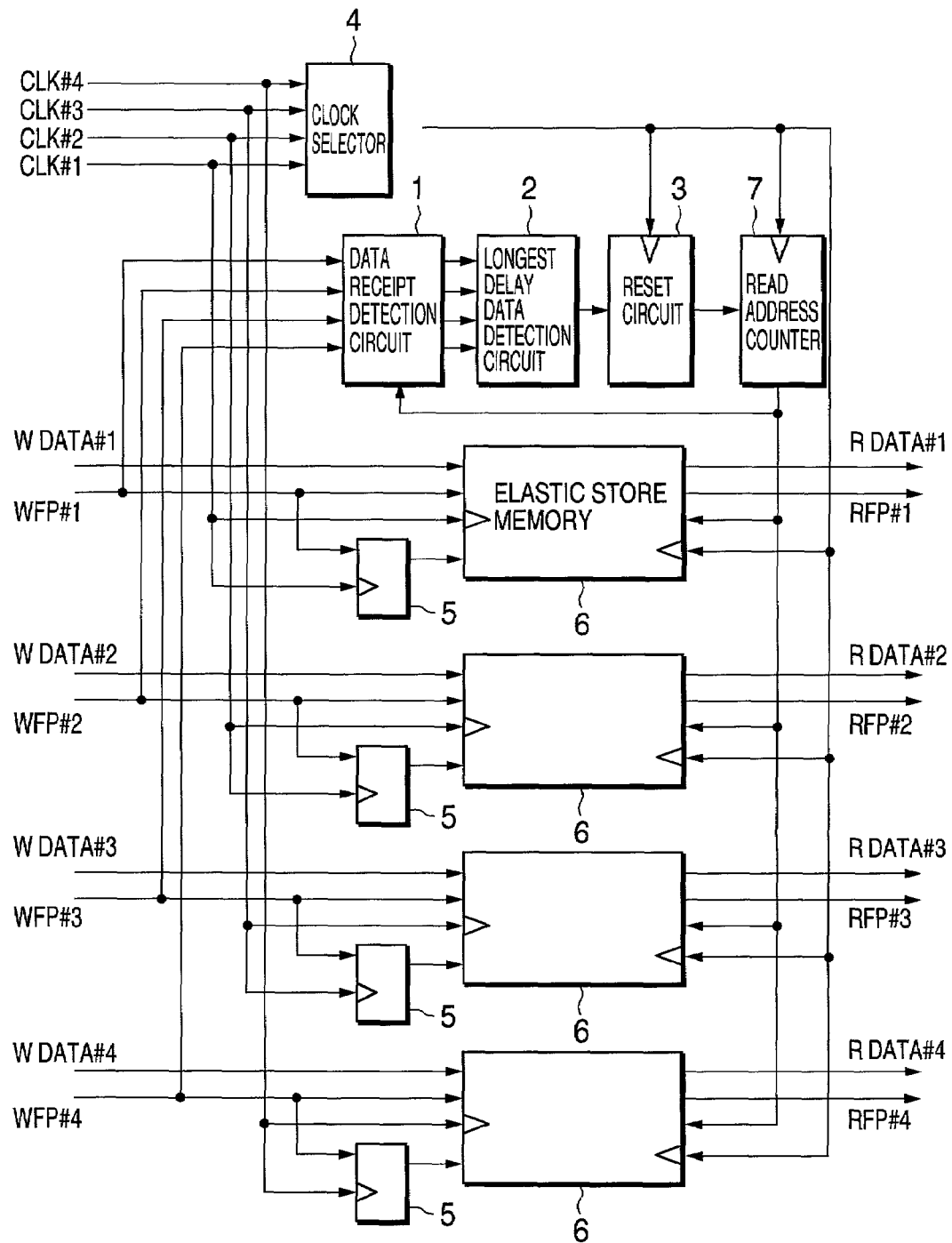
FIG. 3 is a block diagram of an example of the elastic store circuit according to the present invention.

According to the second example, by referring to FIG. 3, the reset pulse is output from the reset circuit 3 to the data receipt detection circuit 1 through the read address counter 7

In the above mentioned elastic store circuit, the clock selected by the clock selector 4 from the clocks (CLK#1–#4) is transmitted to the reset circuit 3, the read address counter 7, and the elastic store memory 6. The read address counter 7 receives the reset pulse.

Figure 4:
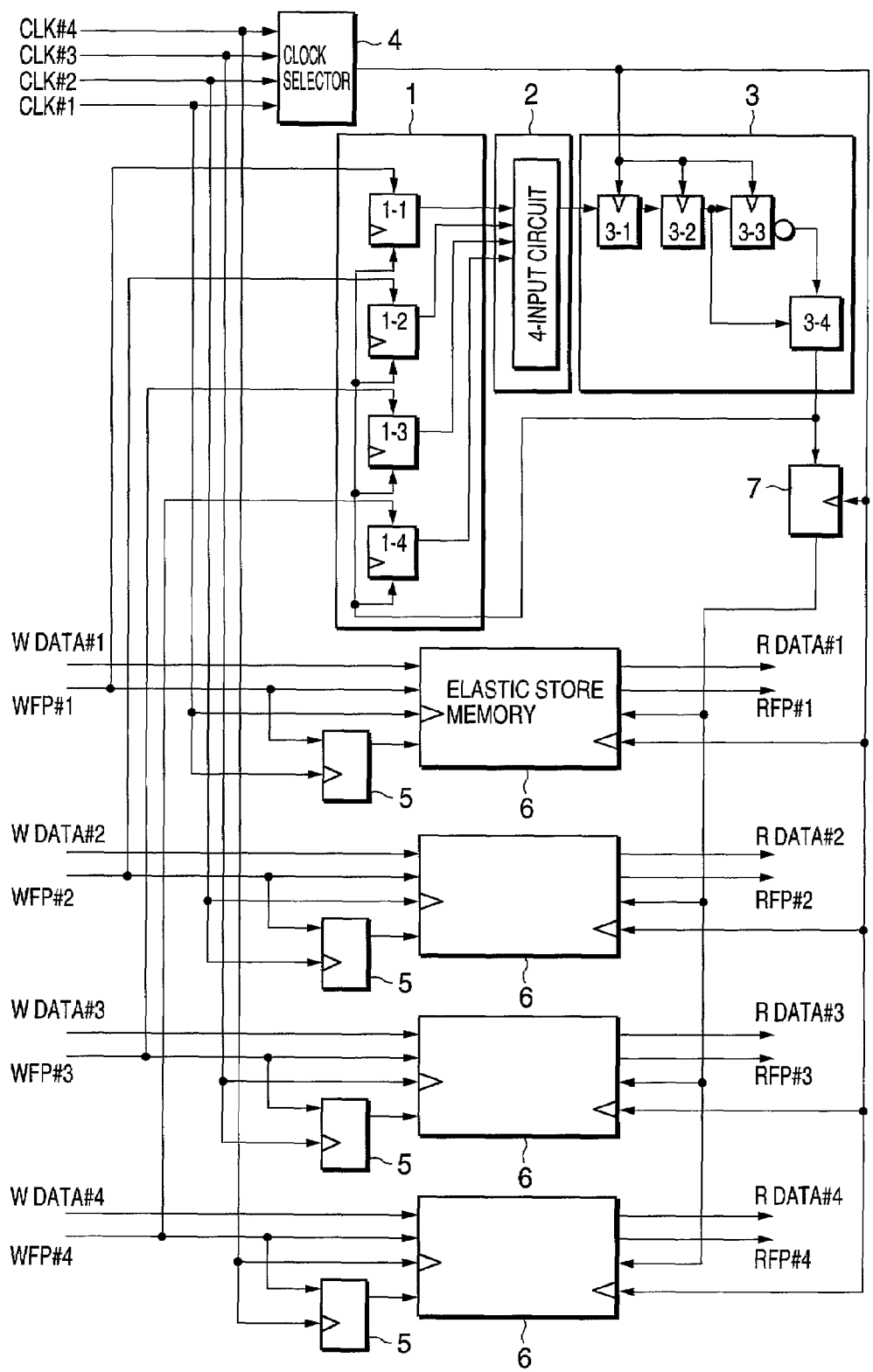
FIG. 4 is a block diagram of a more detailed example of the elastic store circuit according to the present invention.

FIG. 4 shows a detailed example of the central portion of the elastic store circuit shown in FIG. 2. The data receipt detection circuit 1 comprises four set/reset flip-flop circuits 1-1, 1-2, 1-3, and 1-4. The frame pulses (WFP#1–#4) corresponding to the data signals are respectively input into the set input terminals of the flip-flop circuits 1-1, 1-2, 1-3, and 1-4. The reset input terminals of the flip-flop circuits receive the reset pulses output by the reset circuit 3 or the read address counter 7. The longest delay data detection circuit 2 comprises a 4-input AND circuit for receiving the output of the above mentioned four flip-flop circuits. The reset circuit 3 comprises a flip-flop circuit 3-1 for receiving an output signal of the 4-input AND circuit, and two flip-flop circuits 3-2 and 3-3 serially connected to the flip-flop circuit 3-1. These three flip-flop circuits configure a shift register. The clock signal selected by the clock selector 4 is input into these flip-flop circuits. The reset circuit 3 comprises a 2-input AND circuit 3-4 for receiving an input signal and an output signal of the flip-flop circuit 3-3, and outputting a reset signal.

Described below are the operations of the elastic store circuit. Four pieces of data (W data #1–#4) of 2.4 Gbps are input into the elastic store memory 6 respectively. The clocks (CLK#1–#4) and the frame pulses (WFP#1–#4) added to each piece of data #1–#4 are similarly input into the elastic store memory 6 and a write address counter 5. In addition, when the data #1 of 2.4 Gbps is input into the elastic store memory 6, the frame pulse WFP#1 is input into the set terminal of the set/reset flip-flop circuit 1-1. When the frame pulse WFP#1 is input, the set/reset flip-flop circuit 1-1 outputs an H signal. Upon receipt of the frame pulses WFP#2–#4, the set/reset flip-flop circuits 1-2, 1-3, and 1-4 similarly output an H signal. When these flip-flop circuits are set, they continue outputting H signals until they receive reset signals. Therefore, when data receipt is detected, these flip-flop circuits have to be reset. When the 4-input AND circuit (longest delay data detection circuit 2) receives all the four H signals (that is, when it receives the data signal having the longest propagation delay time), the circuit changes the output from the L signal to the H signal. The shift register in the reset circuit 3 (that is, the flip-flop circuits 3-1, 3-2, and 3-3) retimes the change from the L signal to the H signal using the clock selected by the clock selector 4. The 2-input AND circuit 3-4 receives input and output signals of the flip-flop circuit 3-3, and generates a differential pulse having one clock width. When the differential pulse is input as a load pulse into the read address counter 7 of the elastic store memory 6, the read address counter 7 is loaded with the count value of 0, and reset. When the read address counter 7 is initialized, the reading timing of the elastic store memory 6 is in synchronization with the last received data. Therefore, based on the data of 2.4 Gbps having the longest propagation delay time, the read phase of the elastic store memory 6 is determined. As a result, the data (R data #1–#4) of 2.4 Gbps and the frame pulses (RFP#1–#4) are output from the four elastic store memory units 6 at the same timing. The above mentioned differential pulse or the output of the read address counter 7 are used as reset pulses of the set/reset flip-flop circuits 1-1, 1-2, 1-3, and 1-4 of the data receipt detection circuit 1.

As described above, the elastic store circuit according to the present invention detects the order of receiving a plurality of data signals having different propagation delay times by a plurality of set/reset flip-flop circuits and the 4-input AND circuit. Therefore, the circuit has a configuration simpler than that of the conventional circuit, and can detect a received data signal having the longest propagation delay time without fail. Furthermore, the circuit according to the present invention converts the receipt of the data having the longest propagation delay time in the plurality of data signals into an H pulse signal, and a coincident result is retimed, thereby easily performing synchronous operations among plural pieces of asynchronous data.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An elastic store circuit which absorbs a propagation delay time difference among plural pieces of data, comprising:
   a clock selector for selecting a read clock from a plurality of clocks corresponding to the data;
   a data receipt detection circuit for detecting receipt of plural pieces of data;
   a longest delay data detection circuit for detecting data having a longest propagation delay time; and
   a reset circuit for receiving output from said longest delay data detection circuit and the read clock, and transmitting a reset signal to the data receipt detection circuit and a read address counter of elastic store memories.

2. The elastic store circuit according to claim 1, wherein said reset signal is transmitted to said data receipt detection circuit through the read address counter of the elastic store memories.

3. The elastic store circuit according to claim 1, wherein said data receipt detection circuit comprises a plurality of flip-flop circuits for receiving a frame pulse.

4. The elastic store circuit according to claim 3, wherein each flip-flop circuit of the plurality of flip-flop circuits is a set/reset flip-flop circuit, and a set terminal of the flip-flop circuit receives the frame pulse, and a reset terminal of the flip-flop circuit receives the reset signal.

5. The elastic store circuit according to claim 1, wherein said longest delay data detection circuit is an AND circuit for receiving a plurality of output signals of said data receipt detection circuit.

6. The elastic store circuit according to claim 1, wherein said reset circuit comprises:
   a flip-flop circuit for receiving the read clock; and
   an AND circuit for outputting a the reset signal upon receipt of a signal from the flip-flop circuit.

7. An elastic store circuit which absorbs a propagation delay time difference among plural pieces of data, comprising:
   a clock selector for selecting a read clock from a plurality of clocks corresponding to the data;
   a data receipt detection circuit comprising a plurality of first flip-flop circuits for receiving a frame pulse;
   a longest delay data detection circuit comprising an AND circuit for receiving each output signal of said first flip-flop circuits;

a second flip-flop circuit for receiving output of said longest delay data detection circuit and the read clock; and a reset circuit comprising a read address counter of elastic store memory, and a two-input AND circuit for transmitting a reset signal to said data receipt detection circuit.

8. A data receiving method, comprising:

receiving data through a plurality of transmission lines, and storing the data in corresponding elastic store memories;

receiving a plurality of clocks and frame pulses corresponding to the data;

selecting a read clock from the plurality of clocks;

receiving the frame pulses by an AND circuit, and detecting receipt of a latest data; and reading data from each elastic store memory according to a reset signal based on output of the AND circuit and the read clock.

* * * * *